United States Patent
Wu

(10) Patent No.: US 9,173,050 B2
(45) Date of Patent: Oct. 27, 2015

(54) APPLICATION STORE SYSTEM AND DEVELOPMENT METHOD USING THE APPLICATION STORE SYSTEM

(75) Inventor: Yan Wu, Shenzhen (CN)

(73) Assignee: ZTE CORPORATION (CN)

( * ) Notice: Subject to any disclaimer, the term of this patent is extended or adjusted under 35 U.S.C. 154(b) by 176 days.

(21) Appl. No.: 13/876,503

(22) PCT Filed: Mar. 22, 2011

(86) PCT No.: PCT/CN2011/072058
§ 371 (c)(1),
(2), (4) Date: Mar. 28, 2013

(87) PCT Pub. No.: WO2012/041046
PCT Pub. Date: Apr. 5, 2012

(65) Prior Publication Data
US 2013/0183948 A1      Jul. 18, 2013

(30) Foreign Application Priority Data
Sep. 29, 2010   (CN) .......................... 2010 1 0505953

(51) Int. Cl.
*H04W 4/00*    (2009.01)
*G06F 9/44*    (2006.01)
*H04W 4/18*    (2009.01)

(52) U.S. Cl.
CPC ................ *H04W 4/003* (2013.01); *G06F 8/31* (2013.01); *H04W 4/18* (2013.01)

(58) Field of Classification Search
USPC ....................................... 455/414.1; 370/352
See application file for complete search history.

(56) References Cited

U.S. PATENT DOCUMENTS

2003/0012183 A1* 1/2003 Butler et al. .................. 370/352
2003/0161296 A1* 8/2003 Butler et al. .................. 370/352
2007/0150480 A1* 6/2007 Hwang et al. .................... 707/10
2007/0264985 A1* 11/2007 Kapur et al. ............... 455/414.1
2010/0265940 A1* 10/2010 Tenenti et al. ................ 370/389

FOREIGN PATENT DOCUMENTS

| CN | 101014051 A | 8/2007 |
| CN | 101299862 A | 11/2008 |
| CN | 101686253 A | 3/2010 |
| WO | 2010002490 A2 | 1/2010 |

OTHER PUBLICATIONS

International search report for corresponding application No. PCT/CN2011/072058 filed Mar. 22, 2011; Mail date Jul. 7, 2011.

* cited by examiner

*Primary Examiner* — Jinsong Hu
*Assistant Examiner* — Jean Chang
(74) *Attorney, Agent, or Firm* — Cantor Colburn LLP

(57) ABSTRACT

The disclosure discloses an application store system and a development method using the application store system. The application store includes a developer community function entity, an application network store function entity and a telecommunication capability resource function entity. The telecommunication capability resource function entity includes a service execution module, configured to call, through an interface, a telecommunication capability in an integrated service access gateway to execute a service with the telecommunication capability, wherein the service is configured to be embedded in an application; the service with the telecommunication capability executed by the service execution module of the telecommunication capability resource function entity is embedded in the application uploaded in the developer community function entity. With the disclosure, development of the application with the telecommunication capability is accomplished, thereby the profit of operator is guaranteed and the viability of operator in the future is enhanced.

14 Claims, 7 Drawing Sheets

APPLICATION STORE SYSTEM AND DEVELOPMENT METHOD USING THE APPLICATION STORE SYSTEM

FIELD OF THE INVENTION

The disclosure relates to the field of communication, and in particular to an application store system and a development method using the application store system.

BACKGROUND OF THE INVENTION

With the development of the 3rd Generation (3G) mobile communication and the development of the smart phone, mobile internet is applied more and more widely. In such an environment, Apple started providing the iPhone application through an application providing system (called a mobile application store) in 2008 and gained nearly one billion downloads in a short period of time.

The using of the mobile application store makes a large number of independent developers of application. Operators, handset makers and Internet providers also try to develop their respective online application stores, or have already introduced their own online application stores.

In a common application store system, the main function entities are the application network store and the developer community. Of course, the two function entities can be integrated. As shown in FIG. 1, the common application store does not have a function of interfacing with telecommunication capability, so the application developed by developers cannot use telecommunication capability.

Main function modules of related application network store include a portal, an authentication module, an application distribution module, a supply & sales module, a service support module and an operation support module. The portal mainly provides access points of WEB portal, WAP portal, mobile client or PC client. Through the access points, mobile phone users can search for and download application conveniently. The authentication module provides the function of authentication of user and authentication of application. The application distribution module provides functions of various application distribution paths, such as, downloading to computer, WAP PUSH to mobile phone, sending address through short message or directly downloading and installing by client, and other functions related to application. The supply & sales module provides management of application selling in the application store, including the management of store and shelf, the management of online and offline of application and the management of recommendation ranking.

Main functions of related developer community include: application upload, application management function, forum function and developer wiki.

It can be seen that the current system only supports common application and cannot support execution of a service with telecommunication capability. Thus, the application executing the service also cannot realize access of telecommunication capability. This certainly will drop the status of the operator to 'channel', thereby severely impacting the interest of the operator and the viability of the operator in the future.

SUMMARY OF THE INVENTION

The disclosure provides an application store system and a development method using the application store system. This solution may at least solve the above problems.

In one aspect of the disclosure, a telecommunication capability resource function entity is provided, which comprises: a service execution module, configured to call, through an interface, a telecommunication capability in a integrated service access gateway to execute a service with the telecommunication capability, wherein the service is configured to be embedded in an application.

Preferably, the telecommunication capability resource function entity further comprises a service development module, configured to provide a development environment of the service with the telecommunication capability.

Preferably, the telecommunication capability resource function entity further comprises a service test module, configured to provide a telecommunication capability simulation running environment configured to test the service, and return a simulation execution result of executing the service in the environment.

Preferably, the telecommunication capability resource function entity further comprises the telecommunication capability resource function entity further comprises: an authorization module, configured to authorize the service to use the telecommunication capability called by the service; and a first binding module, configured to accept an operation of binding the service with the telecommunication capability called by the service under a condition that the authorization module completes authorization; and the service execution module is further configured to determine whether there is a binding relationship between the currently executed service and the telecommunication capability used by the service, and if yes, continue executing the service, otherwise, end processing.

In another aspect of the disclosure, an application store system is provided, which comprises: a developer community function entity, configured to accept upload of an application, and verify the uploaded application; an application network store function entity, configured to enable a terminal user to download the application verified by the developer community module; and a telecommunication capability resource function entity, which comprises: a service execution module, configured to call, through an interface, a telecommunication capability in a integrated service access gateway to execute a service with the telecommunication capability, wherein the service is configured to be embedded in the application; and the service with the telecommunication capability executed by the service execution module of the telecommunication capability resource function entity is embedded in the application uploaded in the developer community function entity.

Preferably, the telecommunication capability resource function entity further comprises: a service development module, configured to provide a development environment of the service with the telecommunication capability.

Preferably, the telecommunication capability resource function entity further comprises: a service test module, configured to provide a telecommunication capability simulation running environment configured to test the service, and return a simulation execution result of executing the service in the environment.

Preferably, the telecommunication capability resource function entity further comprises: an authorization module, configured to authorize the service to use the telecommunication capability called by the service; and a first binding module, configured to accept an operation of binding the service with the telecommunication capability called by the service under a condition that the authorization module completes authorization; and the service execution module is further configured to determine whether there is a binding relationship between the currently executed service and the telecommunication capability used by the service, and if yes, continue executing the service, otherwise, end processing.

Preferably, the developer community function entity comprises: a second binding module, configured to accept an operation of binding the application with the service embedded in the application; and a binding validation module, configured to inform the service execution module of information about the binding; and the service execution module is further configured to determine whether there is a binding relationship between the current application calling the service and the service called by the application, and if yes, continue executing the service, otherwise, end processing.

Preferably, the service execution module is further configured to, after receiving the information about the binding, determine whether the bound application is authorized to use the bound service, and if yes, return information that the binding is validated to the binding validation module.

Preferably, the application uploaded in the developer community function entity calls the service through a call interface corresponding to the service embedded in the application.

In another aspect of the disclosure, a development method using the application store system is provided, which comprises: embedding the service with the telecommunication capability executed in the service execution module in the application, wherein the service embedded in the application calls the telecommunication capability in the integrated service access gateway through the interface.

Preferably, before embedding the service in the application, the method further comprises: developing the service with the telecommunication capability in the development environment of the service with the telecommunication capability which is provided by the service development module.

Preferably, before embedding the service in the application, the method further comprises: executing the service in the telecommunication capability simulation running environment which is provided by the service test module and is configured to test the service, and obtaining the simulation execution result of executing the service to complete test of the service.

Preferably, before embedding the service in the application, the method further comprises: obtaining, through the authorization module, the authorization of the service using the telecommunication capability called by the service; and binding the service with the telecommunication capability called by the service through the first binding module, so that the service execution module authenticates validity of using the telecommunication capability before executing the service.

Preferably, after embedding the service in the application, the method further comprises: binding, in the developer community function entity, the service with the application in which the service is embedded through the second binding module; and informing, by the developer community function entity, the service execution module of the binding relationship, so that the service execution module authenticates validity of a calling relationship between the application and the service before executing the service.

Preferably, the method further comprises: executing the service embedded in the application by calling the service test module, and obtaining the simulation execution result to implement test of the application; or, executing the service embedded in the application by calling the service execution module, and obtaining an execution result to implement test of the application.

With the disclosure, the telecommunication capability in the integrated service access gateway is called through the interface to execute the service with the telecommunication capability. Then, the service is embedded in the application. The problem of being unable to provide the application with the telecommunication capability is solved, and development of the application with the telecommunication capability is accomplished. Thereby the profit of the operator is guaranteed and the viability of operator in the future is enhanced.

BRIEF DESCRIPTION OF THE DRAWINGS

The drawings described herein are used for providing a further understanding of the disclosure, and constitute a part of the application. The schematic embodiments of the disclosure and description thereof are used for illustrating the disclosure and are not intended to form improper limit to the disclosure. In the drawings.

DETAILED DESCRIPTION OF THE EMBODIMENTS

The disclosure is described below with reference to the drawings and embodiments in detail. It should be noted that the embodiments and features in the embodiments in the application can be combined with each other if not conflicting.

Figure 1:
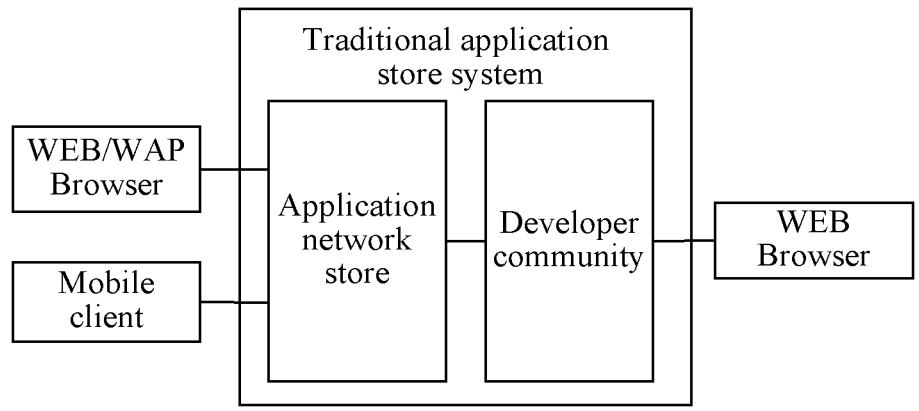
FIG. 1 shows a structure diagram of an application store system according to the related art.
Figure 2:
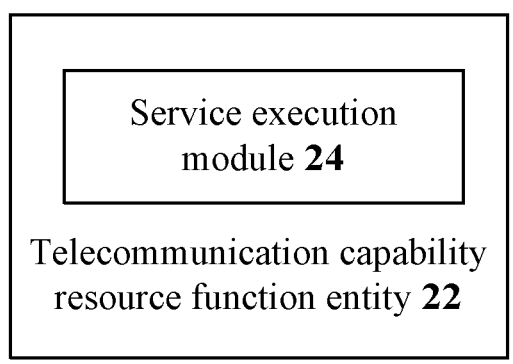
FIG. 2 shows a structure diagram of a telecommunication capability resource function entity according to the embodiment of the disclosure.

FIG. 2 shows a structure diagram of a telecommunication capability resource function entity according to the embodiment of the disclosure. The telecommunication capability resource function entity 22 comprises the service execution module 24, configured to call, through the interface, the telecommunication capability in the integrated service access gateway to execute the service with the telecommunication capability, wherein the service is configured to be embedded in the application.

In the telecommunication capability resource function entity, when executing service, the service execution module 24 calls, through the interface, the telecommunication capability in the integrated service access gateway to execute the service, so as to provide the service with the telecommunication capability. Through the telecommunication capability resource function entity, the service with the telecommunication capability can be realized. Thereby development of the application with the telecommunication capability is accomplished, the profit of operator is guaranteed and the viability of operator in the future is enhanced.

Figure 3:
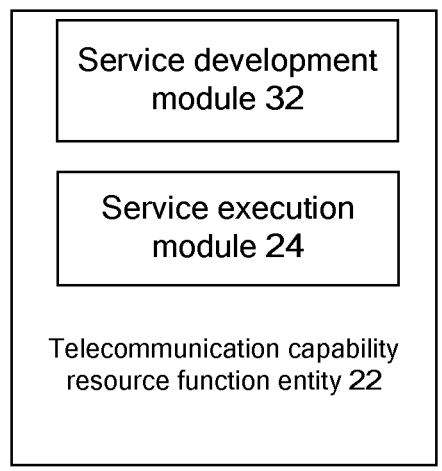
FIG. 3 shows a preferred structure diagram of a telecommunication capability resource function entity according to the embodiment of the disclosure.

FIG. 3 shows a preferred structure diagram of a telecommunication capability resource function entity according to the embodiment of the disclosure. As shown in FIG. 3, the function entity 22 can also include the service development module 32, configured to provide the development environment of the service with the telecommunication capability. Through the service development module 32, the development environment of the service with the telecommunication capability is provided, so that developers can implement development of the service with the telecommunication capability in the telecommunication capability resource function entity 22.

Figure 4:
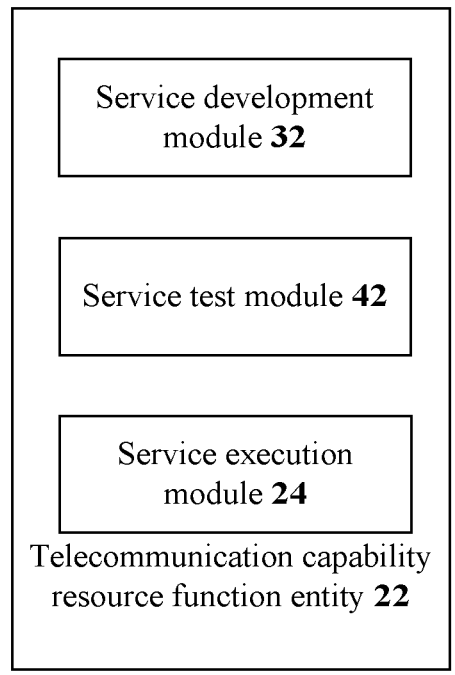
FIG. 4 shows a preferred structure diagram 2 of a telecommunication capability resource function entity according to the embodiment of the disclosure.

As a preferred improvement solution, in addition of implementing a function of developing, the telecommunication capability resource function entity 22 can also implement a function of testing the developed service. FIG. 4 shows a preferred structure diagram 2 of a telecommunication capability resource function entity according to the embodiment of the disclosure. The telecommunication capability resource function entity 22 shown in FIG. 4 can further include the service test module 42, configured to provide the telecommunication capability simulation running environment configured to test the service, and return the simulation execution result of executing the service in the environment. The embodiment enhances the functions of the telecommunication capability resource function entity, provides functions of developing, testing, running etc., and improves practicality of the function entity.

Figure 5:
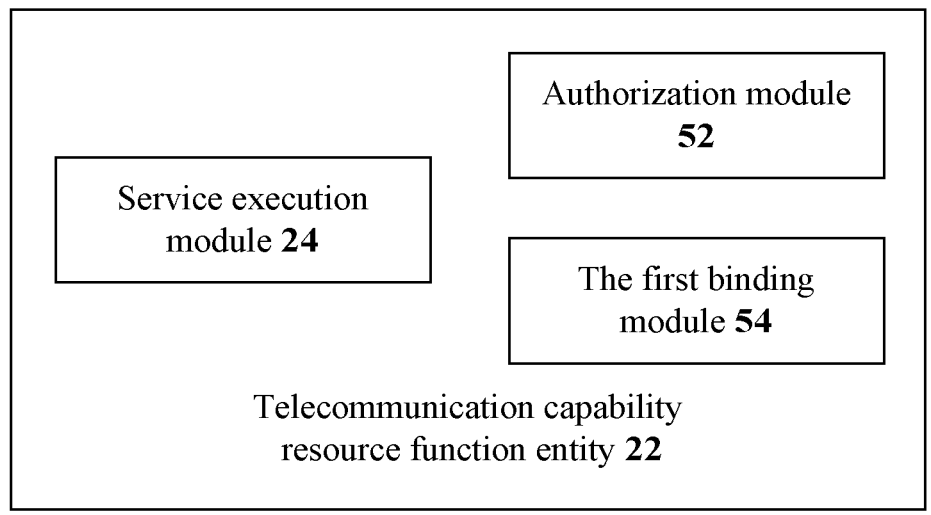
FIG. 5 shows a preferred structure diagram 3 of a telecommunication capability resource function entity according to the embodiment of the disclosure.

After the developers develop the service, the telecommunication capability resource function entity can further provide a function of authorizing the application developed by developers to use the telecommunication capability. The service can use the telecommunication capability only when the service has the authorization provided by the system. Besides, authentication of the service can also be realized by binding the service with the telecommunication capability used by the service. FIG. 5 shows a preferred structure diagram 3 of a telecommunication capability resource function entity according to the embodiment of the disclosure. As shown in FIG. 5, based on FIG. 2, the telecommunication capability resource function entity 22 can further include: the authorization module 52, configured to authorize a certain service to use the telecommunication capability called by the service; and the first binding module 54, configured to accept the operation of binding the service with the telecommunication capability called by the service under the condition that the authorization module 52 completes the authorization. The service execution module 24 is further configured to determine whether there is the binding relationship between the currently executed service and the telecommunication capability used by the service, and if yes, continue executing the service, otherwise, end processing. Preferably, the service execution module can also return the corresponding error message. Through the above structure, the telecommunication capability resource function entity can authorize and authenticate the service developed by developers, which improves the security of system.

Figure 6:
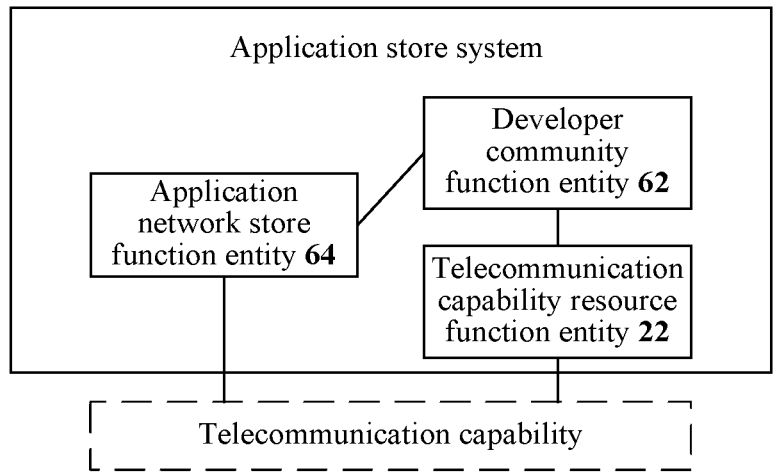
FIG. 6 shows a structure diagram of an application store system according to the embodiment of the disclosure.

The embodiment further provides an improved application store system. FIG. 6 shows a structure diagram of an application store system according to the embodiment of the disclosure. As shown in FIG. 6, the application store system comprises: the developer community function entity 62, configured to accept upload of application, and verify the uploaded application; the application network store function entity 64, configured to enable the terminal user to download the application verified by the developer community module; and the above telecommunication capability resource function entity 22. The service with the telecommunication capability executed by the telecommunication capability resource function entity 22 is embedded in the application uploaded in the developer community function entity 62.

Figure 7:
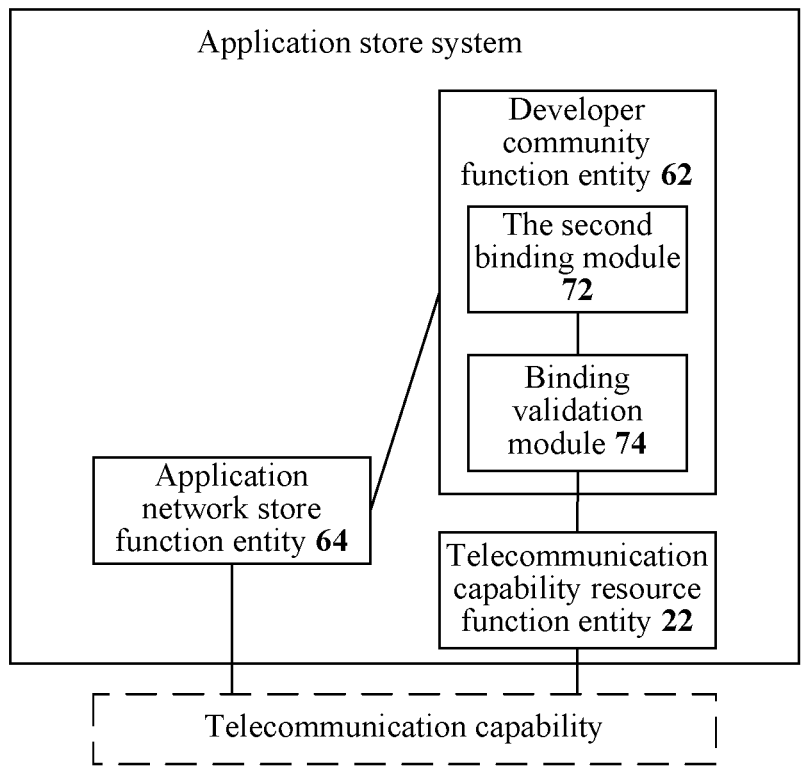
FIG. 7 shows a preferred structure diagram of an application store system according to the embodiment of the disclosure.

In addition, the application store system can also authenticate whether the application can use a certain service. FIG. 7 shows a preferred structure diagram of an application store system according to the embodiment of the disclosure. As shown in FIG. 7, based on FIG. 6, the developer community function entity 62 can include: the second binding module 72, configured to accept the operation of binding the application with the service embedded in the application; and the binding validation module 74, configured to inform the service execution module 24 of information about the binding. The service execution module 24 is further configured to determine whether there is the binding relationship between the current application calling the service and the service called by the application, and if yes, continue executing the service, otherwise, end processing. Preferably, the service execution module can also return the corresponding error message. Through the above structure, the security of system is further improved.

In the network structure shown in FIG. 7, the service execution module 24 can also verify the binding relationship between the application and the service. Binding is allowed only when the service is authorized to use the telecommunication capability. Specifically, after receiving the information about the binding, the service execution module 24 determines whether the bound application is authorized to use the bound service, and if yes, return the information that the binding is validated to the binding validation module 74. The embodiment prevents binding of the application to an unauthorized service, which reduces the operation failure probability of the application.

Preferably, the above application can call the service through the call interface corresponding to the service embedded in the application. The service returns a service execution result to the application. The interface can be an internal custom interface. The form of the interface is not limited. It can be SOAP or REST. The selection of the interface should be subject to the principle that it is convenient to call the application. The specific realization is simple, so that no detailed description is given here.

It should be noted that these modules in above system are configured to implement different functions respectively. Developers can call different modules to implement development of service/application. Among these modules, there is generally no active signal interaction (as a preferred structure, there can be active signal (specifically, the information about the binding and the information that the binding is validated) interaction among the binding validation module 74, the second binding module 72 and the service execution module 24). These modules are only configured to implement their own functions and then feed back to developers, and which module to be executed next is entirely determined by a user. That is to say, the logic sequence of executing these modules is entirely determined by a call sequence of developers. The call sequence of developers may change with specific needs. It is possible that not all modules are used. Thus, connection line is not used for expressing relationship of these modules in the drawings.

The telecommunication capability resource function entity 22 provided in above embodiments aim to provide the functions of executing/developing/testing the service with the telecommunication capability. The telecommunication capability resource function entity 22 is integrated with the developer community function entity 62 and the application network store function entity 64 to form the application store system, which can implement development, management and sale of the application with the telecommunication capability.

The embodiment further provides a development method using the application store system, which comprises: embedding the service with the telecommunication capability executed in the service execution module in the application, wherein the service embedded in the application calls, through the interface, the telecommunication capability in the integrated service access gateway.

Through the method, it is possible to develop the application with the telecommunication capability, thereby the profit of operator is guaranteed and the viability of operator in the future is enhanced.

Before embedding the service in the application, the service with the telecommunication capability can be developed in the development environment of the service with the telecommunication capability which is provided by the service development module. In this way, developers can design service by themselves. Thereby, more individualized application can be developed.

Preferably, before embedding the service in the application, the method can also include: executing the service in the telecommunication capability simulation running environment which is provided by the service test module and is configured to test the service, and obtaining the simulation execution result of executing the service to complete test of the service. The method enhances functions of the development system, provides functions of developing, testing, operating etc., and improves the practicality of the system.

Figure 8:
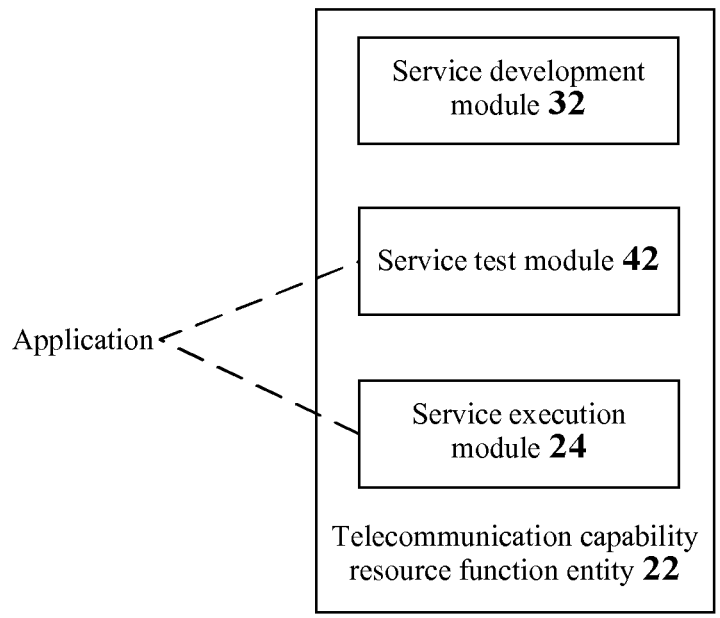
FIG. 8 shows a diagram of applying a service test/execution module to test an application according to the embodiment of the disclosure.

Preferably, for implementing test of the application, the service embedded in the application can also be executed by calling the service test module 42 to obtain the simulation execution result, so as to implement test of the application. Or, the service embedded in the application is executed by calling the service execution module 24 to obtain the execution result to implement test of the application. FIG. 8 shows a diagram of applying a service test/execution module to test an application according to the embodiment of the disclosure. As shown in FIG. 8, the function of testing the application can be provided by using the service test module 42 to test the service or using the service execution module 24 to execute the service. That is to say, the test of the application can be based on either test of the service or regular execution of the service. In the related development process, when testing the application, developers only need to obtain a simulation or actual execution result of the service to further obtain a test result of the application. Thus, few changes are made to the original system and it is easy to realize.

Preferably, before embedding the service in the application, the method can also include: obtaining, through the authorization module, the authorization of the service using the telecommunication capability called by the service; and binding the service with the telecommunication capability called by the service, so that the service execution module can authenticate the validity of using the telecommunication capability before executing the service.

Preferably, after embedding the service in the application, the method further comprises: binding, in the developer community function entity, the service with the application in which the service is embedded; and the developer community function entity informs the service execution module of the binding relationship, so that the service execution module can authenticate the validity of the calling relationship between the application and the service before executing the service.

The embodiments 1 to 3 described below integrate the technical solutions of above multiple preferred embodiments.

Embodiment 1

The embodiment provides a system for realizing a mobile application store and a method for developing application on the system.

Figure 9:
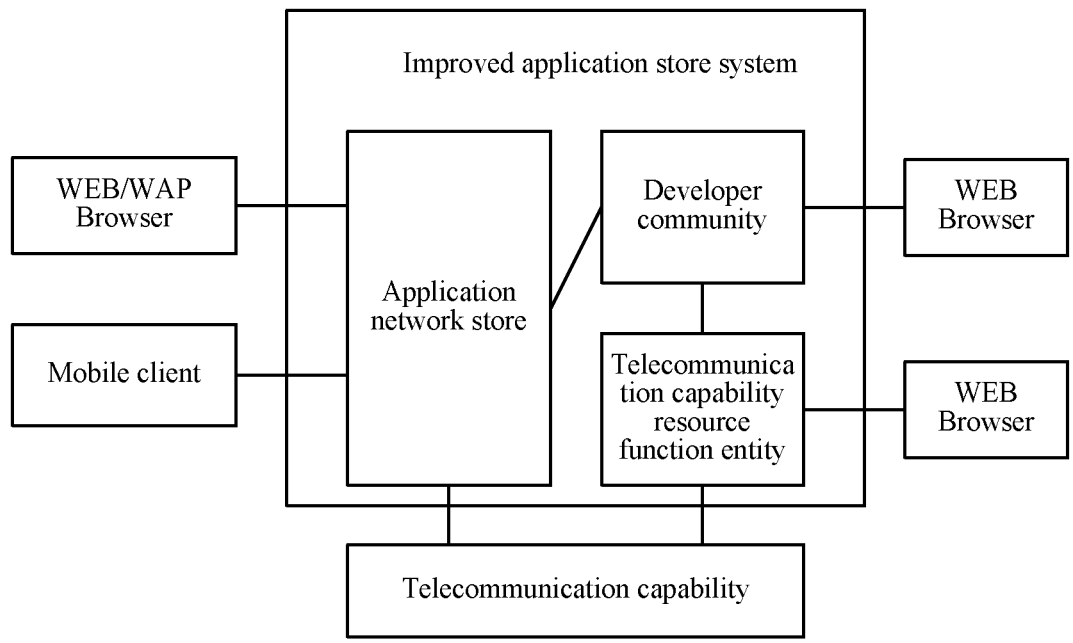
FIG. 9 shows a structure diagram of a system for realizing a mobile application store according to embodiment 1 of the disclosure.

FIG. 9 shows a structure diagram of a system for realizing a mobile application store according to embodiment 1 of the disclosure. As shown in FIG. 9, the system comprises the following function entities.

The application network store function entity: this function entity provides WEB portal, WAP portal and mobile client that mobile phone users access. Users can query applications, purchase applications and download applications in the application network store. And, operator administrators also manage shelf process of mobile applications in the network store.

The developer community function entity: this function entity provides developers with functions such as uploading applications, managing applications, testing applications, forum etc. And, operator administrators can also publish SDK, provide technical support, and perform process managements such as verification and test for the application in this function entity.

The telecommunication capability resource function entity: this function entity provides developers with the service development environment, the service test environment and the service execution environment of the telecommunication capability, provides the interface for accessing the integrated service access gateway, and provides developers with service development wiki. With the service development environment provided by the function entity, developers can use service development tool provided by the system to develop services with the telecommunication capability and embed the services in their own applications. The telecommunication capability resource function entity also provides the interface for accessing the integrated service access gateway. The service running in the service execution environment can use the interface to call the telecommunication capability. In addition, the telecommunication capability resource function entity also provides capability management, service management, service authentication, application authentication and other related functions. Developers can learn the method for developing service in the service development wiki, and develop a service in the service development environment. After completing the service development, developers can deploy the service in the service test environment for testing. If a service needs to use one or more telecommunication capabilities, it is necessary to purchase corresponding telecommunication capability or atomic service in the function entity. Developers can manage their own services. To use their own services normally, developers need to purchase corresponding telecommunication capability to be used by the service or the atomic service provided by the system. This series of processes require administrators to verify or test the whole process, and the service can be formally deployed in the service execution environment only after verification or test is passed.

With the above application store system, developers can develop and upload a service or application with the telecommunication capability, and the main process comprises the following steps.

Step 1: developers develop a service in the service development environment provided by the telecommunication capability resource function entity, and test the service in the service test environment provided by the telecommunication capability resource function entity.

Step 2: developers develop an application, call the service in the service test environment, and test the application.

Step 3: developers purchase a capability in the telecommunication capability resource function entity, bind the purchased capability with the service, and apply for the service to be put online.

Step 4: after the verification is passed, the administrators of the telecommunication capability resource function entity deploy the service in the service execution environment, and perform operation to put the service online. The service execution environment can call capability resources which comprise the integrated service access gateway and the Internet capability. The interface protocol through which the service in the service execution environment calls the capability resources can be SOAP or REST.

Step 5: developers write application information in the developer community function entity, upload the application package, and apply for binding of the application with the service.

Step 6: the developer community administrators verify the application. After the verification is passed, the status of the application is "to be put on shelf" (the application to be put on shelf can be formally sold in the network store only after the network store administrators perform the operation of "put on shelf").

Step 7: the application network store administrators perform "put on shelf" process to the application to be put on shelf. Then, the application is formally on sale to the public in the application network store function entity.

Using the application store system of the embodiment can develop common application as well as the service and application with the telecommunication capability. For describing functions of each function entity in the system in detail, the following embodiment 2 and embodiment 3 respectively describe the whole process that developers use the system to develop common application and the service/application with the telecommunication capability, and upload the application, and finally the application is on sale.

Embodiment 2

Figure 10:
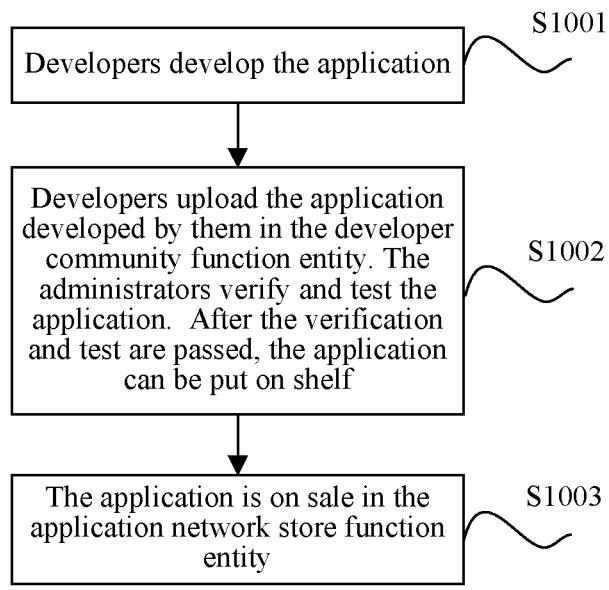
FIG. 10 shows a processing flowchart of using an application store system to develop a common application according to embodiment 2 of the disclosure.

FIG. 10 shows a processing flowchart of using an application store system to develop a common application according to embodiment 2 of the disclosure. As shown in FIG. 10, the process that developers use the system to develop a common application comprises the following steps.

Step S1001: developers develop application in a development environment of the mobile operating system, and generate the application package (development environments, development tools, formats and suffixes of package of different mobile phone applications are different). The development environment is provided by the development tool of the mobile operating system. For example, if developers need to develop an application of the android operating system, then they need to use the development tool of the android mobile application to develop. The typical development tools of android are the eclipse and its android development plug-ins. If developers need to develop an iPhone mobile application, then they need to use the development tool xtool of Apple to develop in the development environment of the MAC operating system.

Step S1002: developers write application information in the developer community and upload the application package. Then the developer community administrators verify and test the application. After the verification and test are completed, the application is to be put on shelf.

Step S1003: the application network store administrators perform "put on shelf" process to the application to be put on shelf. After the application is successfully on shelf, it is started to sell the application to the terminal user.

Figure 11:
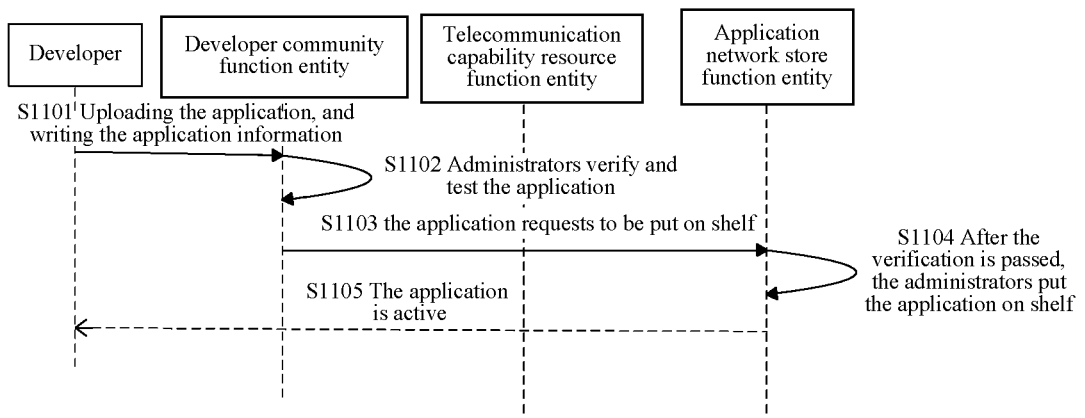
FIG. 11 shows a processing flowchart of uploading a common application according to embodiment 2 of the disclosure.

FIG. 11 shows a processing flowchart of uploading a common application according to embodiment 2 of the disclosure. As shown in FIG. 11, the process of uploading a common application in Step S1002 comprises the following steps.

Step S1101: developers write application information in the developer community and upload the application package.

Step S1102: the developer community administrators verify the application information, and test the application package.

Step S1103: after the developer community administrators pass the verification and test, the status of the application is "to be put on shelf".

Step S1104: the application store administrators can query the application to be put on shelf. The application network store administrators can perform "put on shelf" process to the application to be put on shelf.

Step S1105: the application is active after being put on shelf, and can be queried and purchased by the terminal user in network store portal or network store client.

For the development of a common application, the major operation performed by developers in the application store system is uploading the application package. The uploaded mobile application can be on sale to the terminal user after a series of verifying and testing processes of the network store.

If a server is needed to provide service to the common application, developers can use the private interface in the application to interact with their own servers. For example, it is supposed that developers need to develop a mobile application A, wherein A is a mobile application client of a website B. The application A can obtain updated news and friend list of the website B when connecting to the network, and when using the application A to browse a certain piece of news, the terminal user can select to send a short message or multimedia message to the friends in the website. According to the development principle of the common application, the mobile application A can be interpreted as a client of the website B, and the website B can be interpreted as a server of the mobile application A. When obtaining the updated news, the mobile application A can use the private interface (or the corresponding REST open interface provided by the website B) to initiate a request to B. When needing to send a short message/multimedia message, the mobile application A also needs to initiate a request to B through the corresponding interface. It should be noted that sending the short message/multimedia message or providing the news content is a function provided by B through the corresponding interface for A to call.

According to the traditional operation and development mode, when the website B needs to use the telecommunication capability provided by the operator in operation process, B as a SP needs to apply for and purchase the corresponding capability from the operator. For an enterprise or large website, it is feasible. But, for the common small and medium developers, they cannot use the telecommunication capability provided by operator in their own programs because of not having corresponding SP qualification. Adopting the system provided in embodiment 1 can endow the small and medium independent developers with the ability to develop the application with the telecommunication capability provided by the operator. The whole process that developers use the system of embodiment 1 to develop and upload the application/service with the telecommunication capability, and finally the application is on sale is described below through embodiment 3.

Embodiment 3

Figure 12:
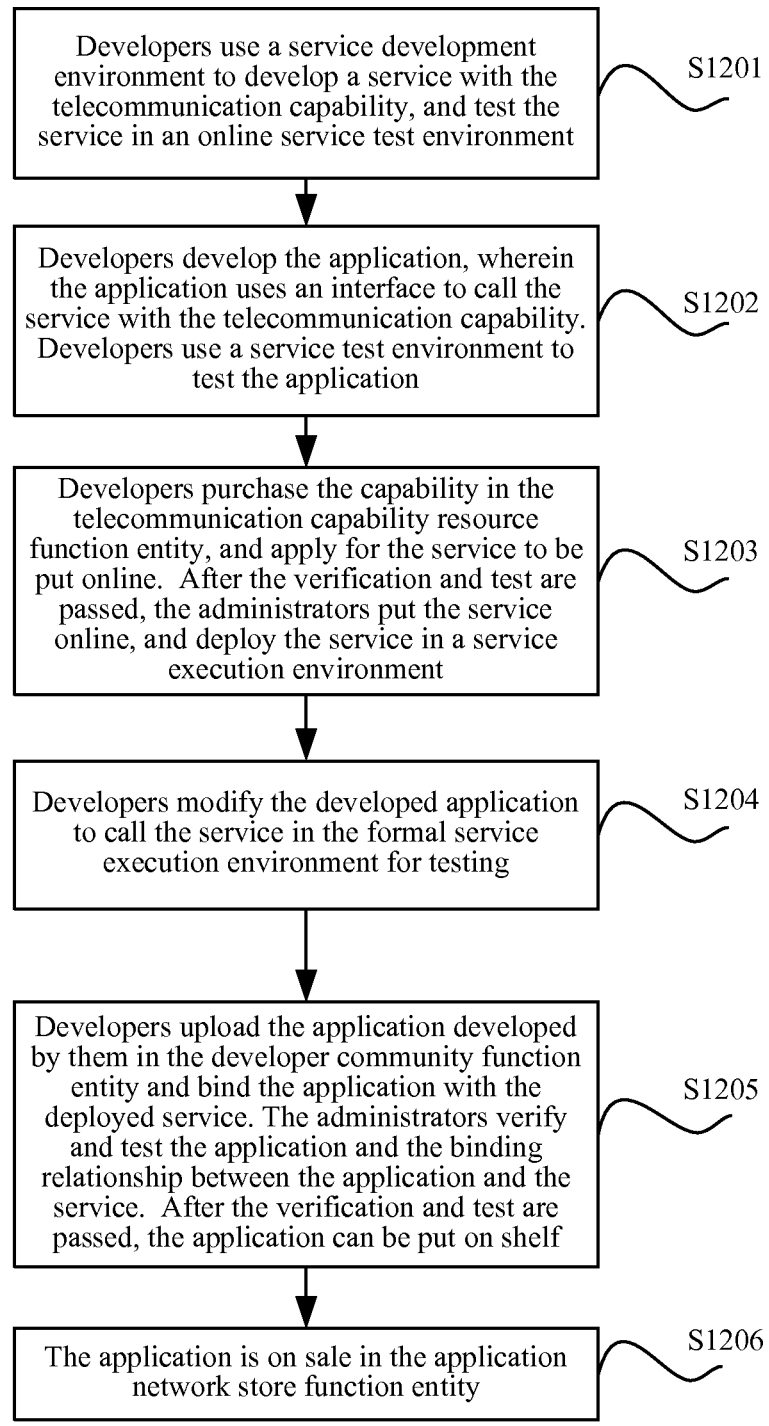
FIG. 12 shows a processing flowchart of using an application store system to develop an application with the telecommunication capability according to embodiment 3 of the disclosure.

FIG. 12 shows a processing flowchart of using an application store system to develop an application with the telecommunication capability according to embodiment 3 of the disclosure. As shown in FIG. 12, the process that developers develop the application with the telecommunication capability and use the service with the telecommunication capability comprises the following steps.

Step S1201: developers use the service development environment provided by the telecommunication capability resource function entity to develop the service with the telecommunication capability, and test the service in an online service test environment.

Step S1202: developers develop the application, wherein the application uses an interface to call the service with the telecommunication capability, and the application can call the service deployed in the service test environment for testing.

Step S1203: developers purchase the capability in the telecommunication capability resource function entity, and apply for the service to be put online. After the verification and test are passed, the administrators put the service online, and deploy the service in the service execution environment. After successfully putting the service online and purchasing the capability, developers can apply for binding of the service with the telecommunication capability. Only after a certain service is bound with a certain telecommunication capability, the service can have the authorization of using the telecommunication capability.

Step S1204: developers modify the application to call the formal service in the service execution environment for testing.

Step S1205: developers upload the developed application in the developer community and bind the application with the deployed service. The administrators verify and test the application and the binding relationship between the application and the service. Only after the application is bound with a certain service, the application can have the authorization of using the service.

Step S1206: after the developer community administrators pass the verification and test of the applications, the application network store administrators can query all the applications whose status is to be put on shelf. The administrators can put the application on sale in the application network store. After the application is successfully put on shelf, it is started to sell the application to the terminal user.

In step S1201, the service with the telecommunication capability means a service flow composed of one or more telecommunication capabilities. For example, a simple service can be sending a short message content to a certain mobile phone. The development process of the service comprises that: 1, developers download the service development tool and learn to use the development tool; 2, developers use the development tool to develop the service, and design the interface of calling the service to be that the inlet parameters are the mobile number and short message content, and the return parameters are the return results about successful or failed sending; 3, the developed service flow is that: the user reads the mobile number and short message content, uses the atomic service of the short message sending capability provided in the development tool to send the short message, reads the return result of the atomic service, and returns the result back to the service caller as the service call return parameter.

A combined service can be a more complex service composed of one or more telecommunication capabilities. For example, the service can be: determining whether a mobile phone is in a certain geographic area, and if yes, sending an advertisement short message to the mobile phone. The development process of the service comprises that: 1, developers download the service development tool and learn to use the development tool; 2, developers design the interface of calling the service to be the mobile phone number of the user, the main geographic location of the advertisement store and the content of the advertisement short message, and design the return parameters to be the return results about successful sending of short message, absence of the user in the area or failed sending of the short message; 3, the development process of service is that: the service reads the mobile phone number of the user and the main geographic location of the advertisement store, and calls the atomic service for locating based on the mobile phone number of the user and the main geographic location of the advertisement store; the atomic service returns a relative distance, and then the service determines according to the relative distance, if the relative distance is less than 1 kilometer, an advertisement short message is sent to the mobile phone user, if the relative distance is more than 1 kilometer, no operation is performed, and the service returns a service operation return result back to the service caller.

The above service development tool is provided by the service development environment for developers to use. The method for calling telecommunication capability resources is packaged. For developers, all they have to do is using a small quantity of script control logic to package the atomic services provided in the tool. However, for the bottom layer, the service calling the telecommunication capability is eventually realized by calling the interface of the integrated service access gateway. For the operator, providing the service development tool lowers the development barrier of developers, and creates better conditions for developers to develop services fast and conveniently. For the service development tool in the service development environment, its specific functions and implementation are out of the scope of the disclosure. The service development tool is for developers and SP, and its main function is to use various telecommunication capabilities and atomic services in it to realize some logical telecommunication capability services. The service developed with the service development service can be called by using the interface, and is triggered by calling the call interface of the service by the caller.

The service test environment in above step S1202 means the environment that operator needs to provide for developers to test the service in the telecommunication capability resource function entity. After completing the development of the service, developers upload their own service and apply for test in the telecommunication capability management portal.

The test environment only provides the telecommunication capability simulation running environment, so that developers are not required to purchase the telecommunication capability when testing the service, but just need to wait for the telecommunication capability administrators to pass verification and deploy the service in the service test environment for testing. When the service is being tested in the service test environment, the calling mode of both calling the interface and returning the interface are the same as those in the formal environment. The difference is that the service does not really call the telecommunication capability when running in the service test environment, but just simulates a return result.

Step S1203 describes the management process of the telecommunication capability/atomic service. Developers can purchase the telecommunication capability/atomic service (obtaining authorization of using the telecommunication capability/atomic service by purchasing) in the telecommunication capability resource function entity. Here, the atomic service means the telecommunication capability component that can be called or purchased by developers in the service development environment, such as the atomic service for sending a short message, the atomic service for sending a multimedia message, or the atomic service for locating. After purchasing the telecommunication capability/atomic service, developers need to bind their own service with the telecommunication capability. The binding process aims to authenticate the application that calls the service in the telecommunication capability resource function entity.

Step S1203 describes binding of the service with the telecommunication capability. The binding of the service with the telecommunication capability requires developers to first purchase the telecommunication capability in the telecommunication capability resource portal and upload the service. When the service uses the telecommunication capability, the service execution environment authenticates the binding relationship between the service and the telecommunication capability. For example, developers uploaded service S1 and service S2, and purchased short message capability A1 and location capability A2, wherein the service S1 uses the two telecommunication capabilities A1 and A2. If developers bind the service S1 with the short message A1 and location capability A2 purchased by them, in the execution process of the service S1, the service execution environment will query whether there is a binding relationship between the service S1 and the telecommunication capability A1 when using A1. If yes, the telecommunication capability A1 is executed; otherwise, execution of the service is failed. It is similar for the telecommunication capability A2. The binding relationship between the service and the telecommunication capability is a multiple-to-multiple relationship. That is to say, S1 can be bound with A1 and A2, and S2 can also be bound with A1 and A2. The binding aims to determine whether the service has authorization of using the telecommunication capability in the execution process of service. If the service is not bound with a certain telecommunication capability, an error occurs when calling of the telecommunication capability is executed.

Step S1205 describes modifying interface for calling the service of the application to be calling the formal environment. The similarity between the service execution environment and the service test environment is that the interfaces for calling the service are same. The difference is that the service execution environment really interfaces with the telecommunication capability and needs to authenticate the specific telecommunication capability, but the service test environment only needs to simulate the success or failure of calling the telecommunication capability instead of really calling the telecommunication capability. For calling the service by the application, the interface is same, but the calling address is different. After development of the service is completed, developers first apply for running of the service in the test environment, wherein the address of the service test environment is ADDRESS1. The address of the service called by the application is ADDRESS1. When the service is formally online and runs in the service execution environment, the address of the service execution environment is ADDRESS2, and the application needs to modify its calling address to be ADDRESS2 to test the service called by it.

Figure 13:
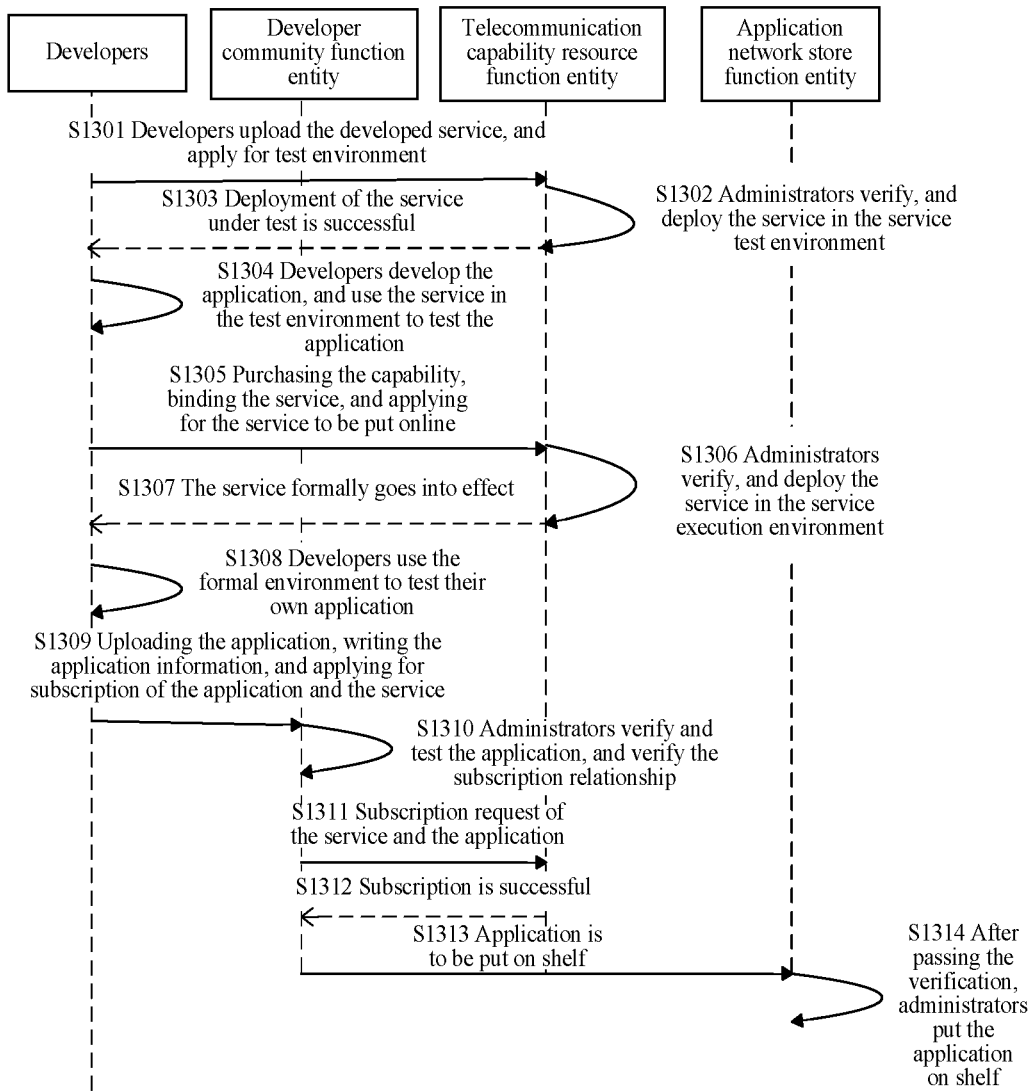
FIG. 13 shows a processing flowchart of uploading an application with the telecommunication capability according to embodiment 3 of the disclosure.

FIG. 13 shows a processing flowchart of uploading an application with the telecommunication capability according to embodiment 3 of the disclosure. As shown in FIG. 13, the process that developers upload the application with the telecommunication capability comprises the following steps.

Step S1301: developers use the service development environment provided by the telecommunication capability resource function entity to develop their own service, upload the service to the telecommunication capability resource function entity, and apply for test.

Step S1302: the telecommunication capability resource administrators verify the application for testing the service.

Step S1303: after the application for testing the service passes the verification, the service can be deployed and tested in the service test environment.

Step S1304: when developing the application calling the service, developers can use the service in the service test environment. The service running in the service test environment calls the telecommunication capability in the simulated way, not in the real way.

Step S1305: developers purchase the telecommunication capability that the service needs to use in the telecommunication capability resource portal, apply for binding of the service with the application, register the service information and apply for the service to be put online.

Step S1306: the telecommunication capability resource administrators verify the service information and the application for the service to be put online. After the verification is passed, the administrators deploy the service in the service execution environment.

Step S1307: the service formally runs in the service execution environment.

Step S1308: developers modify the developed application to call the service in the formal environment, and test the application.

Step S1309: developers write application information in the developer community, upload the application package, and apply for binding of the application with the service.

Step S1310: developer community administrators verify the application information, test the application package, and verify the application for binding of the application with the service.

Step S1311: after the verification of the binding information of the application and the service is passed, the developer community needs to send a request to the telecommunication capability resource function entity, wherein the request can be the internal private real-time response interface, and the form of the interface is not limited.

Step S1312: when receiving the request for binding the application with the service sent from the developer community, the telecommunication capability resource function entity needs to determine the status of the service. Only the service in the status of service permitted can be bound with the application. For example, the status can be that it is online. When receiving the request for binding sent from the developer community, the telecommunication capability resource function entity performs determination according to the service logic. Only after the success of binding is confirmed, the binding can formally go into effect.

Step S1313: after the binding formally goes into effect, the whole subscription process is successful.

Step S1314: the mobile application network store administrators can query the list of all applications to be put on shelf which are uploaded by developers in the developer community. The administrators can put the application on sale in the application network store. After the application is successfully put on shelf, it is started to sell the application to the terminal user.

In conclusion, the solution provided by the embodiment implements the development of the application with the telecommunication capability. Thereby the profit of operator is guaranteed and the viability of operator in the future is enhanced.

It should be noted that the steps shown in the flowcharts of the drawings can be executed in a computer system, such as a set of computer executable instructions. In addition, although the logic sequence is shown in the flowcharts, in some situations, the shown or described steps can be executed in a sequence different from that described here.

Obviously, those skilled in the art should appreciate that above-mentioned modules and steps of the disclosure can be realized by a general-purpose computing device. They can be centralized in a single computing device or distributed on a network composed of multiple computing devices. Optionally, they can be realized by program code which is capable of being executed by the computing device, so that they can be stored in a storage device and executed by the computing device. Or, they are made into integrated circuit modules, respectively; or multiple modules and steps of them are made into a single integrated circuit module to realize. In this way, the disclosure is not limited to any particular combination of hardware and software.

The above is only the preferred embodiments of the disclosure and is not intended to limit the disclosure. For those skilled in the art, the disclosure may have various modifications and changes. Any modifications, equivalent replacements, and improvements within the principle of the disclosure shall fall within the scope of protection of the disclosure.

What is claimed is:

1. A telecommunication capability resource function entity having a hardware processor, comprising:
   a service execution module, configured to call, through an interface, a telecommunication capability in a integrated service access gateway to execute a service with the telecommunication capability, wherein the service is configured to be embedded in an application;
   an authorization module, configured to authorize the service to use the telecommunication capability called by the service; and a first binding module, configured to accept an operation of binding the service with the telecommunication capability called by the service under a condition that the authorization module completes authorization; and
   the service execution module is further configured to determine whether there is a binding relationship between the service currently executed and the telecommunication capability used by the service, and if yes, continue executing the service otherwise, end processing.

2. The telecommunication capability resource function entity according to claim 1, further comprising:
   a service development module, configured to provide a development environment of the service with the telecommunication capability.

3. The telecommunication capability resource function entity according to claim 1, further comprising:
   a service test module, configured to provide a telecommunication capability simulation running environment configured to test the service, and return a simulation execution result of executing the service in the environment.

4. An application store system, comprising:
   a developer community function entity, configured to accept upload of an application, and verify the uploaded application;
   an application network store function entity, configured to enable a terminal user to download the application verified by the developer community function entity; and
   a telecommunication capability resource function entity having a hardware processor, which comprises:
   a service execution module, configured to call, through an interface, a telecommunication capability in a integrated service access gateway to execute a service with the telecommunication capability, wherein the service is configured to be embedded in the application;
   the service with the telecommunication capability executed by the service execution module of the telecommunication capability resource function entity is embedded in the application uploaded in the developer community function entity;
   the telecommunication capability resource function entity further comprises: an authorization module, configured to authorize the service to use the telecommunication capability called by the service; and a first binding module, configured to accept an operation of binding the service with the telecommunication capability called by the service under a condition that the authorization module completes authorization; and
   the service execution module is further configured to determine whether there is a binding relationship between the service currently executed and the telecommunication capability used by the service, and if yes, continue executing the service, otherwise, end processing.

5. The system according to claim 4, wherein the telecommunication capability resource function entity further comprises:
   a service development module, configured to provide a development environment of the service with the telecommunication capability.

6. The system according to claim 4, wherein the telecommunication capability resource function entity further comprises:
   a service test module, configured to provide a telecommunication capability simulation running environment configured to test the service, and return a simulation execution result of executing the service in the environment.

7. The system according to claim 4, wherein
   the developer community function entity comprises: a second binding module, configured to accept an operation of binding the application with the service embedded in the application; and a binding validation module, configured to inform the service execution module of information about the binding; and
   the service execution module is further configured to determine whether there is a binding relationship between the current application calling the service and the service called by the application, and if yes, continue executing the service, otherwise, end processing.

8. The system according to claim 7, wherein
the service execution module is further configured to, after receiving the information about the binding, determine whether the bound application is authorized to use the bound service, and if yes, return information that the binding is validated to the binding validation module.

9. The system according to claim 4, wherein the application uploaded in the developer community function entity calls the service through a call interface corresponding to the service embedded in the application.

10. A development method using the application store system according to claim 4, comprising:
embedding the service with the telecommunication capability executed in the service execution module in the application, wherein the service embedded in the application calls the telecommunication capability in the integrated service access gateway through the interface;
the telecommunication capability resource function entity further comprises: an authorization module, configured to authorize the service to use the telecommunication capability called by the service; and a first binding module, configured to accept an operation of binding the service with the telecommunication capability called by the service under a condition that the authorization module completes authorization; and the service execution module is further configured to determine whether there is a binding relationship between the service currently executed and the telecommunication capability used by the service, and if yes, continue executing the service, otherwise, end processing; and
before embedding the service in the application, the method further comprises:
obtaining, through the authorization module, the authorization of the service using the telecommunication capability called by the service; and binding the service with the telecommunication capability called by the service through the first binding module, so that the service execution module authenticates validity of using the telecommunication capability before executing the service.

11. The method according to claim 10, wherein
the telecommunication capability resource function entity further comprises: a service development module, configured to provide a development environment of the service with the telecommunication capability; and
before embedding the service in the application, the method further comprises:
developing the service with the telecommunication capability in the development environment of the service with the telecommunication capability which is provided by the service development module.

12. The method according to claim 10, wherein
the telecommunication capability resource function entity further comprises: a service test module, configured to provide a telecommunication capability simulation running environment configured to test the service, and return a simulation execution result of executing the service in the environment; and
before embedding the service in the application, the method further comprises:
executing the service in the telecommunication capability simulation running environment which is provided by the service test module and is configured to test the service, and obtaining the simulation execution result of executing the service to complete test of the service.

13. The method according to claim 10, wherein
the developer community function entity comprises: a second binding module, configured to accept an operation of binding the application with the service embedded in the application; and a binding validation module, configured to inform the service execution module of information about the binding; and the service execution module is further configured to determine whether there is a binding relationship between the current application calling the service and the service called by the application, and if yes, continue executing the service, otherwise, end processing; and
after embedding the service in the application, the method further comprises:
binding, in the developer community function entity, the service with the application in which the service is embedded through the second binding module; and informing, by the developer community function entity, the service execution module of the binding relationship, so that the service execution module authenticates validity of a calling relationship between the application and the service before executing the service.

14. The method according to claim 10, wherein
the telecommunication capability resource function entity further comprises: a service test module, configured to provide a telecommunication capability simulation running environment configured to test the service, and return a simulation execution result of executing the service in the environment; and
the method further comprises:
executing the service embedded in the application by calling the service test module, and obtaining the simulation execution result to implement test of the application; or, executing the service embedded in the application by calling the service execution module, and obtaining an execution result to implement test of the application.

* * * * *